C. H. LINDEGARD.
BAIL HOLDER FOR KETTLES.
APPLICATION FILED MAY 2, 1914.
1,133,298.
Patented Mar. 30, 1915.
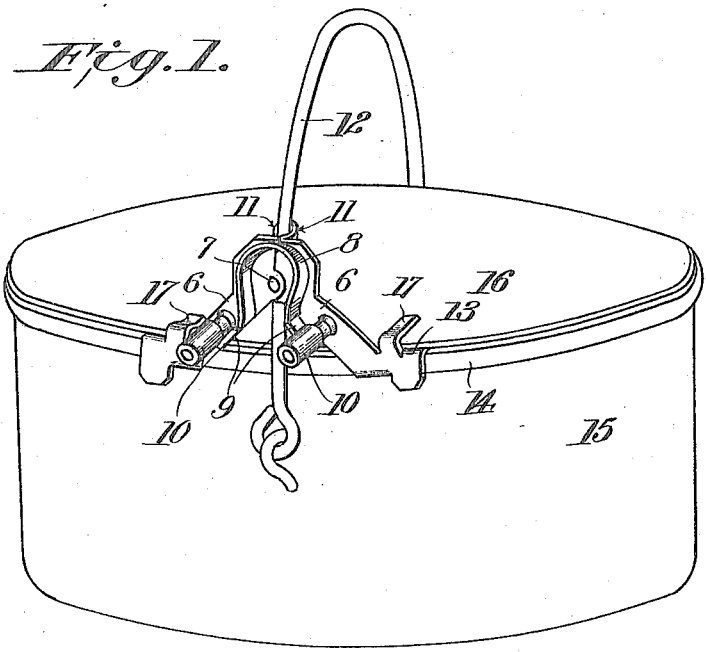
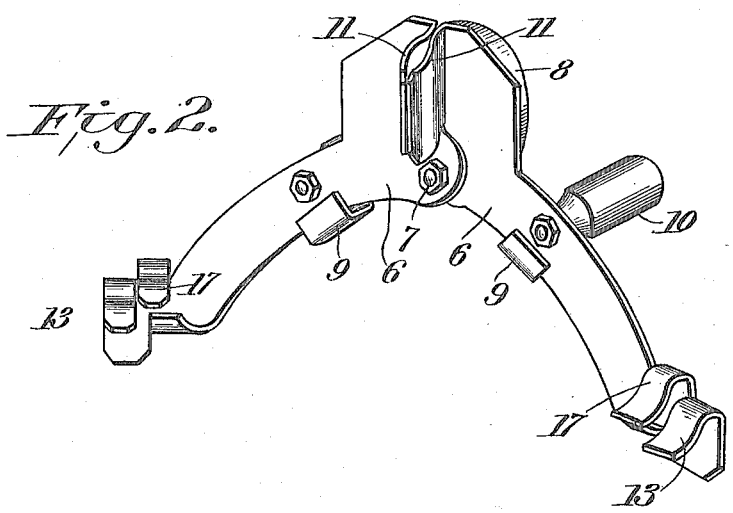
Witnesses
C. M. Walker.
Annie Cooper.
Inventor
Charles H. Lindegard
by John A. Bommhardt
Attorney

UNITED STATES PATENT OFFICE.

CHARLES H. LINDEGARD, OF CLEVELAND, OHIO.

BAIL-HOLDER FOR KETTLES.

1,133,298. Specification of Letters Patent. Patented Mar. 30, 1915.

Application filed May 2, 1914. Serial No. 835,923.

*To all whom it may concern:*

Be it known that I, CHARLES H. LINDEGARD, citizen of the United States, residing at Cleveland, in the county of Cuyahoga and State of Ohio, have invented certain new and useful Improvements in Bail-Holders for Kettles, of which the following is a specification.

This invention relates to bail holders for kettles, buckets and the like, and has for its object to provide an improved device which will hold the bail in upright position and which will also hold the cover on the vessel. It may be used with or without the cover, and includes a pair of spring actuated arms having jaws between which the bail is grasped, and also having clips which engage the rim of the vessel and also the cover when the latter is used.

The invention is illustrated in the accompanying drawings, in which:—

Figure 1 is a perspective view of a kettle provided with the device. Fig. 2 is a detail in perspective of the device, viewed from the inner side.

Referring specifically to the drawings, 6 indicates a pair of similar arms or members which are pivoted together at 7. A flat spring 8 is bent between the members, its ends being retained by clips 9 on the respective members. Each arm has a finger piece 10 projecting on the outer side thereof, and when these are grasped and pressed together it opens the jaws 11 which are located at the upper end of the arms and which project inwardly to hold the bail 12 therebetween.

The device is mounted on the kettle or other vessel by means of clips 13 consisting of spring tongues struck up from the lower ends of the arms, and adapted to fit over the rim 14 of the vessel 15. The cover 16 is held in place by means of tongues 17 projecting inwardly from the ends of the arms and arranged to bear on top of the cover when the latter is in place, said tongues projecting over the edge of the cover. The arms or members are preferably made of sheet metal, with the tongues, clips and jaws integral therewith, and formed by suitably cutting and bending the metal from which the arms are made.

In the use of the device, it is placed on the vessel in the manner indicated, the jaws being opened by pressing the handles to permit the bail to be received therebetween, and when so applied it will hold the bail in upright position and also retain the cover in place, the spring acting to close the jaws upon the bail, to position the clips 13 so that they will engage the rim of the vessel when the bail is held, and to hold the fingers 17 against the cover.

What I claim as new is:

A bail and cover holder for kettles or the like, comprising a pair of arms pivoted together between their ends, said arms having jaws at their upper ends adapted to engage a bail, clips at their lower ends adapted to engage the rim of the kettle when the jaws are engaged with the bail, and tongues projecting inwardly to rest on the cover, and a spring tending to close the jaws.

In testimony whereof, I do affix my signature in presence of two witnesses.

CHARLES H. LINDEGARD.

Witnesses:
 JOHN A. BOMMHARDT,
 J. B. DAVIS.

Copies of this patent may be obtained for five cents each, by addressing the "Commissioner of Patents, Washington, D. C."